April 24, 1945.　　　S. T. HOWARD　　　2,374,206
VENTURI GAS LINE COUPLING
Filed Aug. 9, 1941　　　2 Sheets-Sheet 1

Inventor
Styles T. Howard
By H. F. Doyle
Attorney

April 24, 1945.   S. T. HOWARD   2,374,206
VENTURI GAS LINE COUPLING
Filed Aug. 9, 1941   2 Sheets-Sheet 2
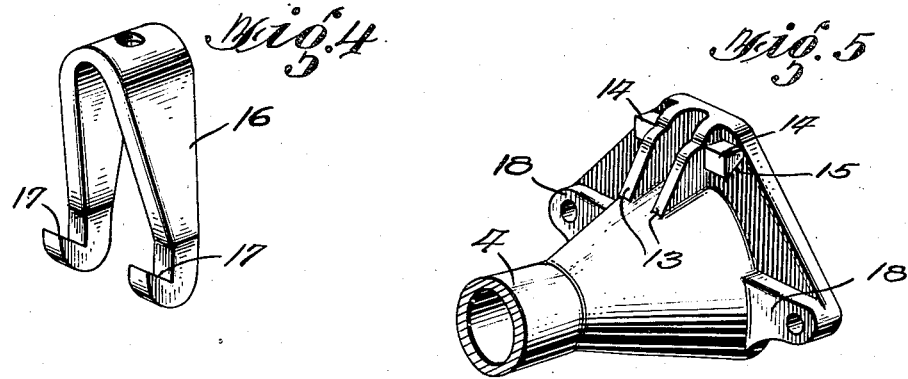
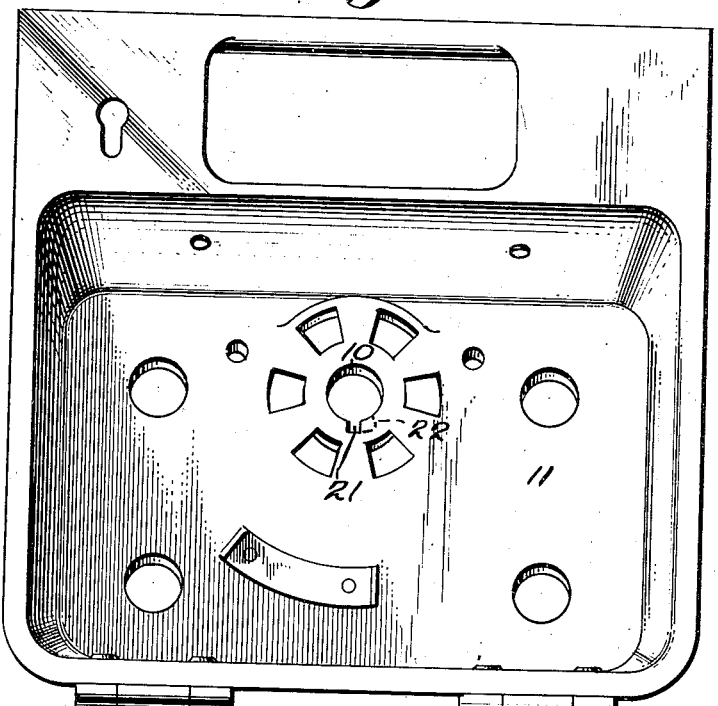
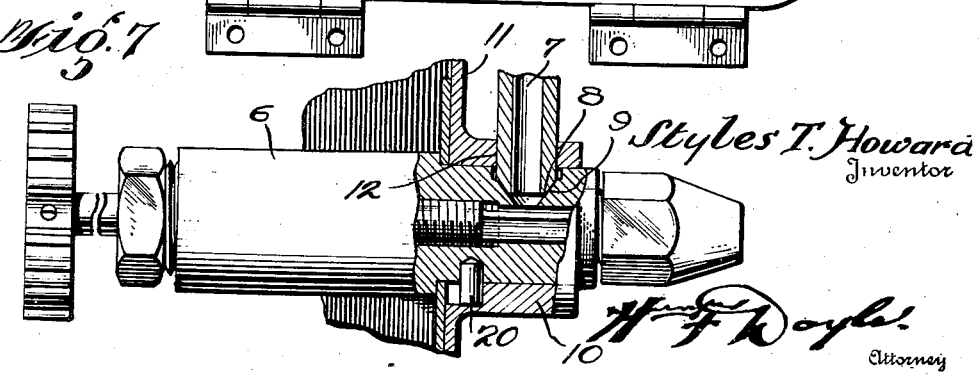
Styles T. Howard
Inventor Patented Apr. 24, 1945

2,374,206

UNITED STATES PATENT OFFICE 2,374,206

VENTURI GAS LINE COUPLING

Styles T. Howard, Jeffersonville, Ind.

Application August 9, 1941, Serial No. 406,203

6 Claims. (Cl. 158—99)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to an improved coupling and more particularly to a combined fuel line and control valve coupling adapted to form a detachable connection between a vapor fuel tube and a control valve mounted to discharge into the outer end of a Venturi extension of a mixing chamber for burners wherein the flow of vapor fuel is under very high pressure and the connection between the fuel tube and control valve must be leak proof when the parts are subjected to severe vibration such as experienced when a burner of which this improved coupling forms a part is operated while in a vehicle, such as a truck, when driving at high speed and over rough terrain. The specific use contemplated for the coupling herein described is in connection with the high-test gasoline burner for use as a heating unit for the present Army portable range, and provides a connection between the mixing chamber, which is permanently mounted on a supporting plate, such as an instrument plate, and a fuel control valve and fuel supply tube, detachably mounted on said plate by the same coupling means.

An object of this invention is to provide a simple, durable and inexpensive structure of such a character that may be effectively used wherever a connection is desired between tubular members wherein a screw thread connection is not desirable or practical.

A further object of this invention is to provide a coupling that may be disassembled and assembled promptly without injury to the parts.

Another object is to provide a coupling of a character that will not permit of the final locking of its parts together until said parts are properly arranged to provide an effective connection when the set screw is brought to its locking position.

The above and further objects will appear in the following specification and be finally pointed out in the appended claims.

A preferred embodiment of this invention is shown and described, but it will be understood that changes in form and minor details of construction may be resorted to without departing from the spirit of the invention or fall beyond the scope of the claims.

Similar numerals indicate corresponding parts in all the figures of the drawings in which:

Fig. 4 is a detail perspective of the coupling yoke.

Fig. 5 is a detailed perspective view of the coupling end of the Venturi tube of a mixing chamber.

Fig. 6 is a face view of the supporting plate showing the slot for the passage of locking pin carried by the valve.

Fig. 7 is a view of the valve showing its locking pin.

Figure 1:
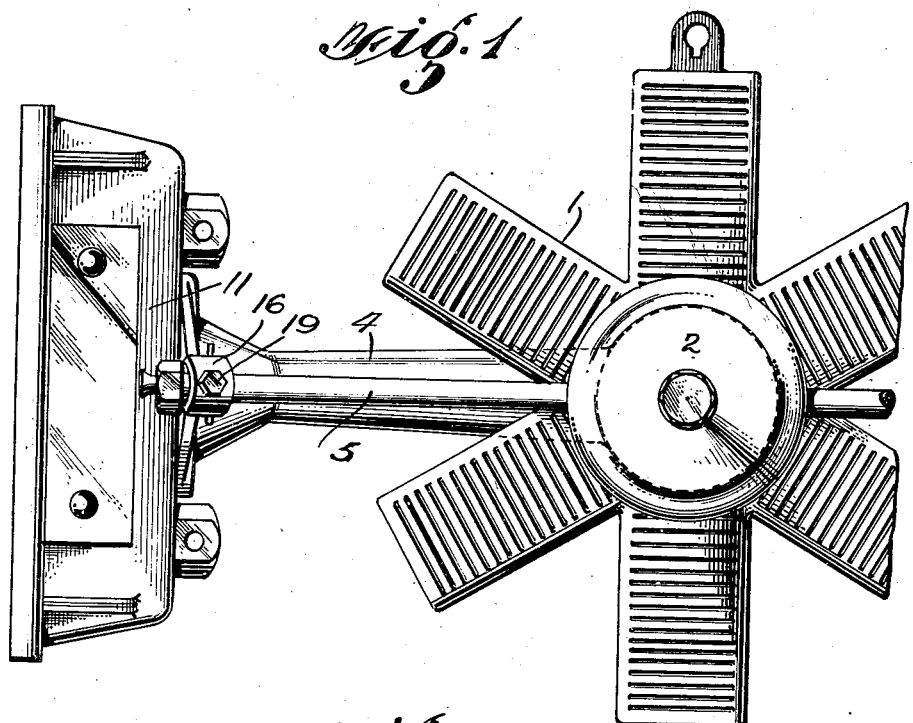
Fig. 1 is a plan view showing the coupling of this invention and adjacent parts.
Figure 2:
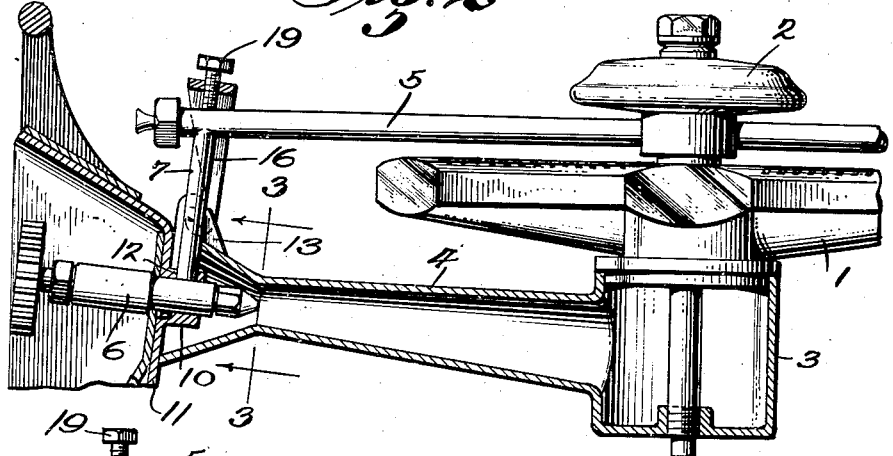
Fig. 2 is a vertical section, parts being shown in elevation, on line 2—2 of Fig. 1.
Figure 3:
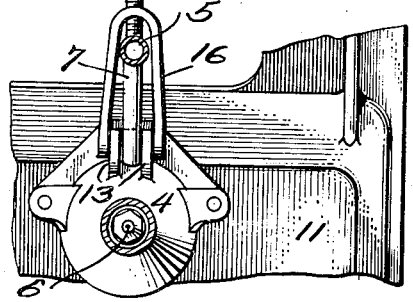
Fig. 3 is a vertical section on line 3—3 of Fig. 2, looking in the direction of the arrows.

Reference now being had to the drawings by numerals, 1 indicates a burner, 2 a filter, 3 a mixing chamber, and 4 a Venturi tube extension of the mixing chamber, in the outer end of which is mounted, by the improved coupling, the fuel supply tube 5, and the control valve 6, of a fire unit constructed for use in the present Army portable range.

The fuel supply tube 5 is provided with a downwardly extending tubular arm 7, provided at its lower end with the male member of a ground joint 8 adapted to be seated in a complementary female seat 9 as formed in the upper face of the body of the control valve 6. The connection between the arm 7 and control valve 6 is a contact connection that is subjected to very high internal pressure and the ground joint between the members must be accurately formed. The joint above described is one wherein the parts may be quickly assembled and disassembled, which is comparatively often, under the conditions of use as above referred to.

As shown in the drawings, the control valve 6 is mounted in a sleeve 10 projecting from an instrument panel or other supporting plate 11. Said control valve is mounted with its inlet opening in which the ground seat 9 is formed when the parts are assembled, in line with an opening 12 in the sleeve 10.

The end of the Venturi tube extension 4 of the mixing chamber 3 is provided with vertical projecting lugs 13—13 provided with laterally extending lugs 14—14 the under surfaces of which are undercut at 15 to form attaching means for the lower ends of yoke 16.

The yoke 16 is of inverted U-shape having undercut hooks 17—17 at the lower ends of its arms adapted to engage lug 14—14 of the Venturi tube in such a manner as to prevent accidental disengagement of the parts when subjected to severe and continuous vibration. The end of the Venturi tube is further provided with laterally extending mounting ears 18—18 whereby the end of said tube is rigidly mounted on the supporting plate 11 and provides a sealed inclosure for the end of the control valve within the end of the Venturi tube.

The end of the fuel supply tube 5 and the downwardly extending tubular arm 7 are arranged within yoke 16, the arm 7 extending down between the upwardly projecting lugs 13 of the Venturi tube, with its lower end 8 arranged in seat 9 of the control valve 6.

When yoke 16 is passed down over the parts above referred to and its hooks 17 are arranged in engagement with lugs 14—14 of the Venturi tube, and a set screw 19 threaded into the top of yoke 16 is brought at its lower end into contact with the upper notched surface of the fuel supply tube and tightened, the parts will all be firmly assembled. The lower end of tubular arm 7 having ground surface 8 and ground seat 9 are clamped firmly together to prevent leakage at said joint when subjected to internal pressure of over 50 lbs., or, in fact, up to any pressure that the supply tube 5 and its extension 7 will withstand.

The control valve is provided with a pin 20 adapted to pass through slot 21 in the supporting plate 11 after the valve is slipped into sleeve 10 of said plate. When the valve is fully inserted it is rotated a sufficient distance to cause pin 20 to pass in rear of plate 11 and into contact with a stop 22 which will lock the valve in the sleeve 10 against withdrawal and also bring into alignment the inlet opening and ground seat 9 of the valve, and opening 12 of the sleeve.

When the lower ground connecting end of arm 7, which extends down between lug 13—13 of the Venturi tube is firmly clamped, in ground seat 9 in the valve, the valve will be locked against reverse rotary movement and the effective coupling of the parts together will be accomplished.

The benefits of the coupling of the character herein described will be apparent when it is understood that when liquid fuel is converted into a vapor and consumed, any small passages through which the fuel passes, more or less rapidly clog up with carbon or other foreign matter and fail to function properly, and its further purpose of providing for the rapid disassembling and assembling of the parts through which liquid fuel is vaporized and its flow controlled by valve into a mixing chamber, said parts having reduced passages often requiring cleaning or replacement, that the construction here shown was designed.

The separation and assembling of the parts is accomplished as follows: To separate the fuel tube and the control valve, it is only necessary to release or back off set screw 19 which will permit the lowering of yoke 16 and the release of its undercut lower ends 17—17 from the laterally extending lugs 14—14 on vertical extensions 13—13 of the Venturi tube 4. The yoke may then be moved back on the fuel tube which will permit the withdrawal of extension 7 from opening 12 and opening 9 of the sleeve and control valve, respectively, for cleaning or replacement purposes.

Assembling of the parts require the above steps in the reverse order, namely, the valve is adjusted in the socket 10 with its ground joint in line with openings 12 and 9, the extension 7 of the fuel supply tube 5 may then be passed down through said openings and be seated in its lower end in valve 6, the yoke may then be arranged in position with its lower ends 17—17 in engagement with lugs 14—14. Set screw 19 may then be adjusted to firmly lock the parts together and establish a leak proof passage from the fuel supply tube to the interior of the control valve and from the valve to the Venturi tube extension of the mixing chamber.

Having fully described my invention, what I claim and desire to secure by Letters Patent is:

1. A fuel line and control valve coupling comprising, in combination with a supporting plate having a sleeve provided with an opening, a mixing chamber having a flange mounted on said supporting plate and lugs extending from the flange, a fuel supply tube, a fuel control valve mounted in said sleeve of the supporting plate having a lateral inlet opening adapted to align with the opening in the sleeve to receive said tube, and detachable means for clamping said fuel supply tube and said fuel control valve together, comprising a yoke detachably connected with said lugs on said flange, extending over said fuel supply tube, and a setscrew mounted in the yoke and operative to force the end of said tube into engagement with the valve to lock the tube, sleeve and valve together.

2. A fuel line and control valve coupling comprising, in combination with a supporting plate having a sleeve provided with a lateral opening, a mixing chamber having a flange mounted on the supporting plate and lugs, extending from the flange, a slot arranged in the supporting plate, a fuel control valve mounted in the sleeve having a lateral inlet opening and a depression surrounding same adapted to rest in line with the opening in the sleeve, a pin extending laterally from said valve adapted to pass through said slot in the supporting plate when inserting the valve into the sleeve, said valve when rotated within the sleeve adapted to cause said pin to rest in rear of and at one side of said slot in the plate and prevent withdrawal of the valve from the sleeve and bring into alignment said valve inlet opening and said lateral opening in the sleeve, a fuel supply tube adapted to extend through said opening in the sleeve and rest at its end in said depression in the fuel control valve and detachable means for clamping said tube, sleeve and valve together comprising a yoke detachably connected to said laterally extending lugs of the mixing chamber flange and extending over said fuel supply tube and a setscrew mounted in the yoke in contact with the supply tube adapted to press the end of said tube through said opening in the sleeve and into said depression in the control valve, and prevent rotation of the valve in the sleeve.

3. A fuel supply tube and fuel control valve coupling comprising, in combination with a supporting plate having a sleeve provided with a lateral opening, a mixing chamber having a flange mounted on said supporting plate and lugs extending from the mixing chamber flange, a fuel control valve mounted in the sleeve of the supporting plate having a lateral inlet opening and a seat surrounding the opening, said opening and seat of the control valve adapted when the parts are assembled, to rest in line with the opening in the sleeve, a fuel supply tube extending through the opening in the sleeve, adapted to be clamped in said seat in the valve and supply fuel to the valve, of means for clamping the fuel supply tube and the fuel control valve together comprising, a yoke having hooks at its lower ends adapted to be detachably secured beneath the lugs on the flange of the mixing chamber and extend over said fuel supply tube, a setscrew mounted in the top of the yoke for contact with the fuel supply tube adapted to clamp the fuel supply tube at its lower end through the opening in the sleeve and in the seat of the control valve, and detachably couple the fuel supply tube, the fuel control valve and the sleeve together and prevent longitudinal and rotary movement of the fuel valve in the sleeve of the supporting plate.

4. A fuel supply tube and fuel control valve coupling comprising, in combination with a supporting plate provided with a sleeve having a lateral opening, a mixing chamber having a flange mounted on the supporting plate and lugs extending from the mixing chamber flange, a fuel control valve having a lateral inlet opening and a seat surrounding same adapted to be arranged in line with the lateral opening in the sleeve and discharge into said mixing chamber, a fuel supply tube adapted to extend through the lateral opening in the sleeve and rest at its inner end in the seat of the control valve and prevent longitudinal and rotary movement of the control valve in the sleeve, and supply fuel to the valve, of detachable means for clamping the fuel supply tube and said fuel control valve together comprising a yoke having hooks at its inner ends detachably connected beneath said lugs of the mixing chamber flange, said yoke extending over the fuel supply tube and a setscrew mounted in the outer looped end of the yoke, adapted to contact the supply tube and detachably clamp the inner end of the tube through the opening in the sleeve and into the seat of the valve and provide for prompt disassembling and assembling of the parts.

5. A fuel supply tube and fuel control valve coupling comprising, in combination with a supporting plate having a sleeve provided with a lateral opening, a mixing chamber having a flange mounted on the supporting plate, lugs extending from the mixing chamber mounting flange, a fuel control valve mounted in the sleeve of the supporting plate having a lateral inlet opening and a seat surrounding the inlet opening, the openings in the sleeve, in the valve and the seat, all, when parts are assembled, arranged in axial alignment, a fuel supply tube adapted to extend through the opening in the sleeve and seated at its inner end in the seat of the control valve to supply fuel to the valve and prevent longitudinal and rotary movement of the valve in the sleeve of the mounting plate, of detachable means for clamping the fuel supply tube and fuel control valve together comprising, a yoke having hooks detachably connected at its inner ends beneath the lugs of the mixing chamber flange and extending at its outer looped end over the fuel supply tube, a setscrew mounted in said outer looped end arranged to contact the fuel supply tube and adapted to clamp said tube and valve together, to prevent accidental separation of the parts and permit prompt disassembling and assembling of the parts.

6. A fuel line and control valve coupling comprising, in combination with a supporting plate having a sleeve provided with a lateral opening, a mixing chamber having a flange mounted on the supporting plate, lugs extending laterally from the flanges of the mixing chamber, a fuel control valve mounted in said sleeve adapted to discharge fuel into the mixing chamber having a lateral fuel inlet passage and a depressed seat surrounding said passage in line with the opening in the sleeve, a fuel supply tube extending through the opening in the sleeve and seated at its inner end in the seat and in communication with the opening in the control valve adapted to supply fuel to the valve, of detachable means for clamping the fuel supply tube to the fuel control valve comprising, a yoke having hooks detachably connected at its inner ends beneath the lugs on the flange of the mixing chamber and extending over said fuel supply tube and a setscrew mounted in the outer looped end of the yoke adapted to be brought into contact with the fuel supply tube and detachably clamp the end of the supply tube in the seat of the control valve, adapted to supply fuel to the fuel control valve and detachably connect the sleeve of the supporting plate, the fuel supply line and the fuel control valve together.

STYLES T. HOWARD.